United States Patent
Zhang et al.

(10) Patent No.: US 9,287,793 B2
(45) Date of Patent: Mar. 15, 2016

(54) ISOLATED POWER SUPPLY, CONTROL SIGNAL TRANSMISSION CIRCUIT AND METHOD THEREOF

(71) Applicant: Silergy Semiconductor Technology (Hangzhou) LTD, Hangzhou, ZheJiang Province (CN)

(72) Inventors: Lingdong Zhang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 115 days.

(21) Appl. No.: 14/287,394

(22) Filed: May 27, 2014

(65) Prior Publication Data
US 2014/0355312 A1 Dec. 4, 2014

(30) Foreign Application Priority Data
Jun. 3, 2013 (CN) .......................... 2013 1 0217185

(51) Int. Cl.
H02M 3/335 (2006.01)

(52) U.S. Cl.
CPC ...... *H02M 3/33592* (2013.01); *H02M 3/33507* (2013.01)

(58) Field of Classification Search
USPC ........... 323/269, 271, 272; 363/16, 18–21.01, 363/21.06, 21.09, 21.1, 21.14, 21.17, 21.18, 363/65
See application file for complete search history.

(56) References Cited

U.S. PATENT DOCUMENTS

| | | | |
|---|---|---|---|
| 8,390,964 B2 | 3/2013 | Chang et al. | |
| 2012/0032728 A1* | 2/2012 | Coleman | H02M 3/158 327/434 |
| 2013/0300384 A1* | 11/2013 | Wang | H02M 1/00 323/271 |
| 2014/0133192 A1* | 5/2014 | Lin | H02M 3/33592 363/21.14 |
| 2014/0192575 A1* | 7/2014 | Olivik | H02M 3/33592 363/89 |

* cited by examiner

*Primary Examiner* — Adolf Berhane
*Assistant Examiner* — Gary Nash
(74) *Attorney, Agent, or Firm* — Michael C. Stephens, Jr.

(57) ABSTRACT

In one embodiment, method of generating a control signal for an isolated power supply, can include: (i) generating a first ground noise component with a first predetermined proportionality to a ground noise signal; (ii) generating a first peak signal based on a first control signal having the ground noise signal, where the first peak signal comprises a second ground noise component with a second predetermined proportionality to the ground noise signal; (iii) generating a second control signal based on a difference between the first peak signal and the first ground noise component; and (iv) controlling, by the second control signal, a switch of the isolated power supply.

17 Claims, 10 Drawing Sheets

ISOLATED POWER SUPPLY, CONTROL SIGNAL TRANSMISSION CIRCUIT AND METHOD THEREOF

RELATED APPLICATIONS

This application claims the benefit of Chinese Patent Application No. 201310217185.7, filed on Jun. 3, 2013, which is incorporated herein by reference in its entirety.

FIELD OF THE INVENTION

The present invention generally relates to the field of power supplies, and more particularly to an isolated power supply, control signal transmission circuit, and an associated method.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. In this way, the output voltage and/or the output current of the switching power supply can be maintained as substantially constant. Therefore, the selection and design of the particular control circuitry and approach can be important to the overall performance of the switching power supply. Thus, using different detection signals and/or control circuits can result in different control effects on power supply performance.

SUMMARY

In one embodiment, a control signal transmission circuit configured in an isolated power supply, can include: (i) a first signal converter coupled to a first ground potential having a ground noise signal, and to a second ground potential of the isolated power supply, where the first signal converter is configured to generate a first ground noise component with a first predetermined proportionality to the ground noise signal; (ii) a second signal converter coupled to a first control signal having the ground noise signal, and to the second ground potential, where the second signal converter is configured to generate a first peak signal based on the first control signal and having a second ground noise component with a second predetermined proportionality to the ground noise signal; and (iii) a control signal generator configured to generate a second control signal based on a difference between the first peak signal and the first ground noise component, where the second control signal is configured to control a switch of the isolated power supply.

In one embodiment, method of generating a control signal for an isolated power supply, can include: (i) generating a first ground noise component with a first predetermined proportionality to a ground noise signal; (ii) generating a first peak signal based on a first control signal having the ground noise signal, where the first peak signal comprises a second ground noise component with a second predetermined proportionality to the ground noise signal; (iii) generating a second control signal based on a difference between the first peak signal and the first ground noise component; and (iv) controlling, by the second control signal, a switch of the isolated power supply.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

For switching power supplies, the control signals for power switches must be accurate and effective to maintain the normal stable operation of the system and to achieve constant current, constant voltage or synchronous rectifier control in different applications. Especially in isolated switching power supplies, the original signal (e.g., feedback signal of secondary output voltage) and the target control signal (e.g., control signal of primary switch) are on different sides. Therefore, it is a key point on how to generate the target control signal in accordance with the original control signal accurately and rapidly.

Figure 1:
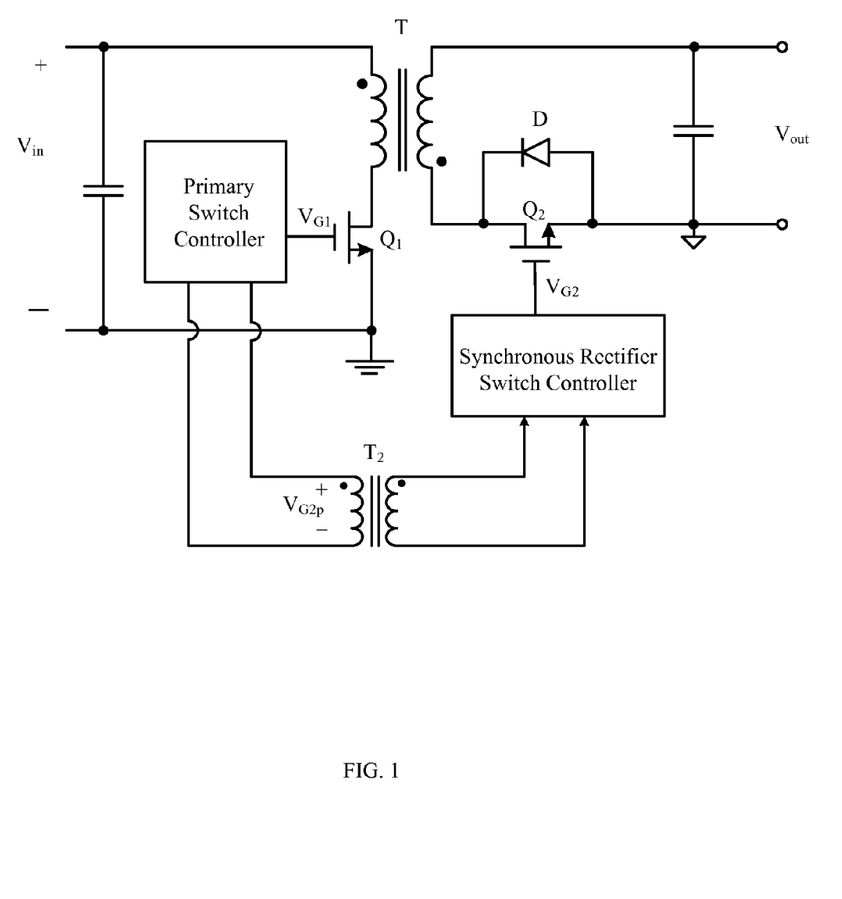
FIG. 1 is a schematic block diagram of an example flyback synchronous rectifier switching power supply employing a transformer to transmit the control signal.

Referring now to FIG. 1, shown is a schematic block diagram of an example flyback synchronous rectifier switching power supply that utilizes a transformer to transmit a control signal for controlling the synchronous rectifier switch. In this example, the primary switch controller can generate pulse-width modulation (PWM) signals $V_{G1}$ and $V_{G2p}$, which may be complementary signals. Transformer $T_2$ can effectively transfer PWM signal $V_{G2p}$ to the secondary side of transformer T for control of synchronous rectifier switch $Q_2$.

When PWM control signal $V_{G1}$ is active high, complementary PWM signal $V_{G2p}$ can be inactive low. In this case, primary switch $Q_1$ can be turned on by PWM signal $V_{G1}$. PWM control signal $V_{G2p}$ can be transferred or otherwise provided to the secondary side of the power supply by transformer $T_2$, for control of synchronous rectifier switch $Q_2$ via control voltage $V_{G2}$ generated from the synchronous rectifier switch controller. When PWM signal $V_{G1}$ is low, complementary PWM control signal $V_{G2p}$ can be high. Correspondingly, primary switch $Q_1$ can be turned on by PWM control signal $V_{G1}$, and synchronous rectifier switch $Q_2$ can be turned off by control signal $V_{G2}$.

The PWM control signal of the primary side of the power supply can be transferred or otherwise provided to the secondary side of the power supply by transformer $T_2$ to control the on and off states of synchronous rectifier switch $Q_2$. In addition, isolation between the primary ground and the secondary ground can be achieved by transformer $T_2$. However, drawbacks of this approach include significantly increased volume and cost due to use of transformer, as well as less accurate and responsive control due to relatively poor transmission of the control signal at high frequencies.

In one embodiment, a control signal transmission circuit configured in an isolated power supply, can include: (i) a first signal converter coupled to a first ground potential having a ground noise signal, and to a second ground potential of the isolated power supply, where the first signal converter is configured to generate a first ground noise component with a first predetermined proportionality to the ground noise signal; (ii) a second signal converter coupled to a first control signal having the ground noise signal, and to the second ground potential, where the second signal converter is configured to generate a first peak signal based on the first control signal and having a second ground noise component with a second predetermined proportionality to the ground noise signal; and (iii) a control signal generator configured to generate a second control signal based on a difference between the first peak signal and the first ground noise component, where the second control signal is configured to control a switch of the isolated power supply.

Figure 2:
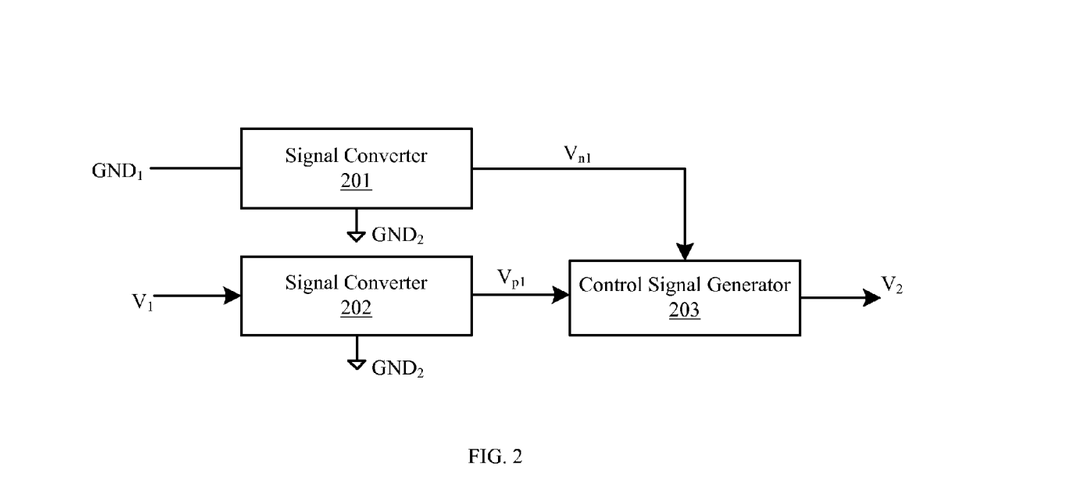
FIG. 2 is a schematic block diagram of an example control signal transmission circuit in an isolated power supply, in accordance with embodiments of the present invention.

Referring now to FIG. 2, shown is a schematic block diagram of an example control signal transmission circuit in an isolated power supply, in accordance with embodiments of the present invention. This particular control signal transmission circuit example can include signal converter 201, signal converter 20, and control signal generator 203. Signal converter 201 can be coupled between ground potential $GND_1$ (e.g., including ground noise signal $V_{GND1}$) and ground potential $GND_2$. Signal converter 201 can be configured to generate ground noise component $V_{n1}$ in proportion to ground noise signal $V_{GND1}$.

In particular embodiments, signal converter 201 can be implemented via any suitable signal converter circuitry (e.g., RC circuits, circuit configurations that sample ground noise signal $V_{GND1}$ of ground potential $GND_1$ by division, etc.). Signal converter 202 can be coupled between control signal $V_1$ (e.g., including ground noise signal $V_{GND1}$) and ground potential $GND_2$. Signal converter 202 can be configured to generate peak signal $V_{p1}$ (e.g., including a ground noise component) in accordance with control signal $V_1$. The ground noise component (e.g., $V_{n1}$) can be in a proportion with ground noise signal $V_{GND1}$.

Figure 3:
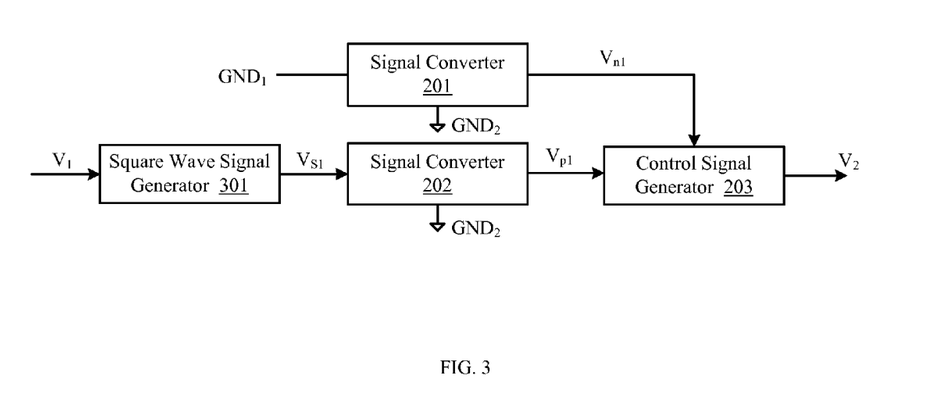
FIG. 3 is a schematic block diagram of an example control signal transmission circuit in isolated power supply, in accordance with embodiments of the present invention.

Particular embodiments can also include a signal processing circuit coupled between control signal $V_1$ and signal converter 202 to process control signal $V_1$ and then to generate peak signal $V_{p1}$ (see, e.g., FIG. 3). Signal converter 202 can be implemented via any suitable signal converter circuitry (e.g., RC circuits, sampling circuits, etc.). For example, circuits that can achieve a differential operation and/or voltage division of control signal $V_1$ (e.g., including ground noise signal $V_{GND1}$) can be utilised in the implementation of signal converter 202.

Control signal generator 203 can receive ground noise component $V_{n1}$ from signal converter 201, and peak signal $V_{p1}$ from signal converter 202. Control signal $V_2$ can be generated by control signal generator 203 in accordance with a difference between peak signal $V_{p1}$ and ground noise component $V_{n1}$. For example, control signal $V_2$ can be used to control a switching operation of the isolated power supply, such as via control of a synchronous rectifier switch. Any suitable form of control signal $V_2$ can be supported in particular embodiments. For example, control signal $V_2$ can be a clean square wave signal without a ground noise signal or component.

Control signal generator 203 can include comparator circuitry, such as one or more standard or hysteresis comparators. Alternatively, a combination of subtraction circuitry and a pulse signal generator can be used in the implementation of control signal generator 203. In any case, a ground noise component or contribution of peak signal $V_{p1}$ can be substantially eliminated by control signal generator 203 in the generation of control signal $V_2$. Thus, any suitable circuitry that can be used to eliminate ground noise components as discussed herein can be employed in particular embodiments.

For example, when the respective proportionalities of ground noise component $V_{n1}$ and peak signal $V_{p1}$ to ground noise signal $V_{GND1}$ are consistent (e.g., the same, or within a predetermined amount of each other), the ground noise component of peak signal $V_{p1}$ can substantially be eliminated by control signal generator 203. As a result, no ground noise component may be included in control signal $V_2$. In this way, the control accuracy of the power supply can be improved in order to achieve switching control of the power supply under high frequency operation, or a wider range of frequencies.

Referring now to FIG. 3, shown is a schematic block diagram of an example control signal transmission circuit in isolated power supply, in accordance with embodiments of the present invention. In this example, the control signal transmission circuit for an isolated power supply can also include square wave signal generator 301, which can receive control signal $V_1$ and may output square wave signal $V_{S1}$. Peak signal $V_{p1}$ can be generated in accordance with square wave signal $V_{S1}$ by signal converter 202. This particular configuration of FIG. 3 can further improve control accuracy for the isolated power supply.

Figure 4:
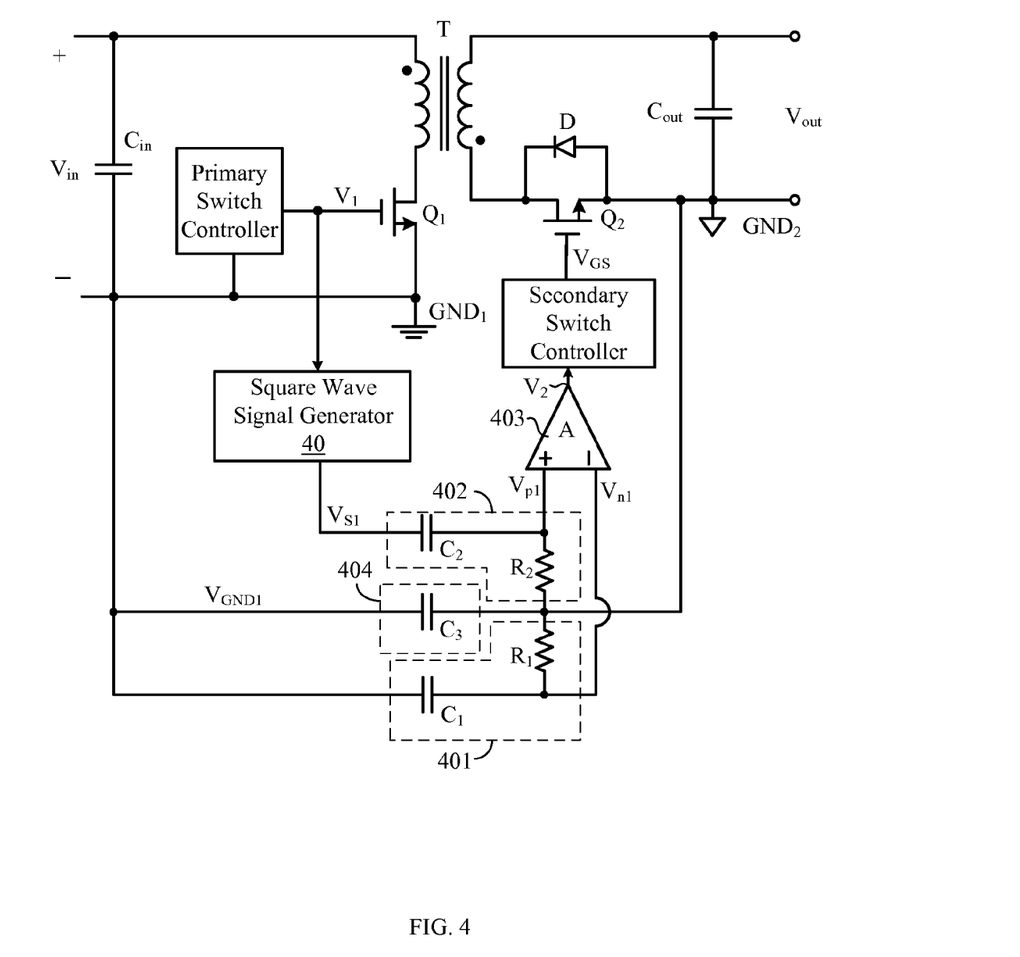
FIG. 4 is a schematic block diagram of an example control signal transmission circuit applied in a flyback synchronous rectifier switching power supply, in accordance with embodiments of the present invention.

Referring now to FIG. 4, shown is a schematic block diagram of an example control signal transmission circuit applied in a flyback synchronous rectifier switching power supply, in accordance with embodiments of the present invention. In this example, control signal $V_1$ can be generated by a primary switch controller to control primary switch $Q_1$ of the flyback switching power supply. Control signal $V_1$ can be processed (e.g., inverted) by square wave signal generator 40 to generate square wave signal $V_{S1}$ (e.g., including ground noise signal $V_{GND1}$). For example, a delay circuit may also be included in square wave signal generator 40 to delay control signal $V_1$ to prevent occurrence of "shoot-through" of the synchronous rectification flyback switching power supply.

The control signal transmission circuit can include signal converter 401, signal converter 402, and control signal generator 403, with corresponding functionality as discussed above with respect to FIGS. 2 and 3. Signal converter 401 (e.g., corresponding to signal converter 201) can be coupled between ground potential $GND_1$ and ground potential $GND_2$ of the isolated power supply. Ground noise signal $V_{GND1}$ can be included in ground potential $GND_1$. Signal converter 401 can be configured to generate ground noise component $V_{n1}$, which can be in proportion to ground noise signal $V_{GND1}$.

For example, signal converter 401 can include resistor $R_1$ and capacitor $C_1$. Capacitor $C_1$ can be coupled to ground potential $GND_1$, and to resistor $R_1$. Also, resistor $R_1$ can be coupled to potential $GND_2$. The signal at a common node of capacitor $C_1$ and resistor $R_1$ can be configured as ground noise component $V_{n1}$. Signal converter 402 can be coupled to square wave signal $V_{S1}$ and ground potential $GND_2$. For example, the ground noise signal of square wave signal $V_{S1}$ (e.g., $V_{GND1}$) can be the same as that of ground potential $GND_1$ (e.g., $V_{GND1}$). Signal converter 402 can be configured to generate peak signal $V_{p1}$ that includes a ground noise component that is proportional to ground noise signal $V_{GND1}$, and is based on square wave signal $V_{S1}$.

Signal converter 402 (e.g., corresponding to signal converter 202) can include capacitor $C_2$ and resistor $R_2$. Capacitor $C_2$ can receive square wave signal $V_{S1}$, and can be coupled to resistor $R_2$, which can also be coupled to ground potential $GND_2$. A signal at a common node of capacitor $C_2$ and resistor $R_2$ can be configured as peak signal $V_{p1}$. In this particular example arrangement, when the capacitances of capacitors $C_1$ and $C_2$ are equivalent, and the resistances of resistors $R_1$ and $R_2$ are also equivalent, the respective proportionalities of ground noise component $V_{n1}$ and peak signal $V_{p1}$ to ground noise signal $V_{GND1}$ may also be equivalent.

Control signal generator 403 (e.g., corresponding to control signal generator 203) can receive ground noise component $V_{n1}$ from signal generator 401 and peak signal $V_{p1}$ from signal converter 402, and may generate control signal $V_2$ in accordance with a difference between peak signal $V_{p1}$ and ground noise component $V_{n1}$. Secondary or synchronous rectifier switch $Q_2$ can be controlled by control signal $V_2$ to achieve switching control of the isolated power supply. For example, control signal $V_2$ can be a substantially clean square wave signal without a ground noise signal component or substantial contribution.

In one example, control signal generator 403 can include a standard comparator A. In another example, control signal generator 403 can include a hysteresis comparator. Of course, other suitable circuitry or comparator implementations can be utilized for control signal generator 403. In addition, isolation circuit 404 (e.g., including capacitor $C_3$) can be arranged between ground potential $GND_1$ and ground potential $GND_2$ to provide isolation between ground potential $GND_1$ and ground potential $GND_2$.

Figure 5:
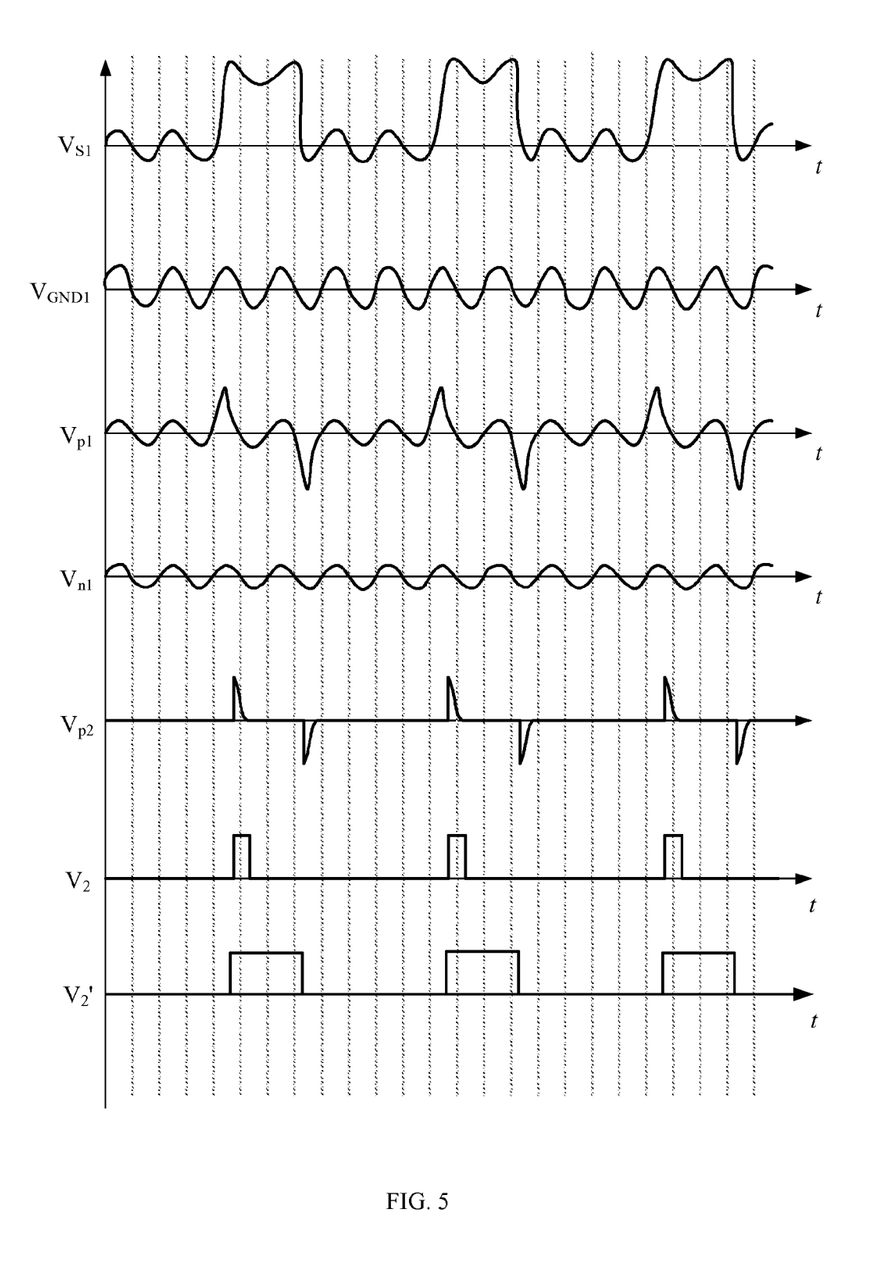
FIG. 5 is a waveform diagram showing example operation of an isolated power supply by an example control signal transmission circuit, in accordance with embodiments of the present invention.

Referring now to FIG. 5, shown is a waveform diagram of example operation of an isolated power supply by an example control signal transmission circuit, in accordance with embodiments of the present invention. In this example, ground noise signal $V_{GND1}$ of ground signal $GND_1$ of the isolated power supply can be divided by signal converter 401 to generate ground noise component $V_{n1}$ in a predetermined proportion with ground signal $GND_1$. When control signal $V_1$ goes from low to high, primary switch $Q_1$ can be turned on. In addition, control signal $V_1$ can be processed by square wave signal generator 40 to generate square wave signal $V_{S1}$. For example, the logic state of square wave signal $V_{S1}$ can be opposite to that of control signal $V_1$.

Peak signal $V_{p1}$ can be generated by signal converter 402 through differential processing of square wave signal $V_{S1}$. When a voltage transition or "jump" on square wave signal $V_{S1}$ occurs, a peak pulse can be generated on peak signal $V_{p1}$. Due to the voltage division function of signal converter 402, a ground noise signal in a predetermined proportion with ground noise signal $V_{GND1}$ can be included in peak signal $V_{p1}$. For example, when control signal generator 403 is generated by way of a standard comparator A, the input terminals of the comparator can receive ground noise component $V_{n1}$ and peak signal $V_{p1}$. When peak signal $V_{p1}$ is greater than ground noise component $V_{n1}$ (shown as a positive peak point of peak signal $V_{p1}$), control signal $V_2$ (e.g., a pulse signal) can be generated at an output of comparator A. A high level on control signal $V_2$ can turn on secondary switch $Q_2$ through the secondary switch controller.

In one example, when control signal generator 403 includes a hysteresis comparator, the waveform of the signal at the output of hysteresis comparator A can be as shown in $V_2'$ of FIG. 5. In another example, when control signal generator 403 is configured as a combination of a subtraction circuit and a pulse signal generator, peak signal $V_{p2}$ without a ground noise component can be generated by subtracting ground noise component $V_{n1}$ from peak signal $V_{p1}$. In this example, the pulse signal generator can be configured to generate control signal $V_2$ or $V_2'$ based on peak signal $V_{p2}$.

Figure 6:
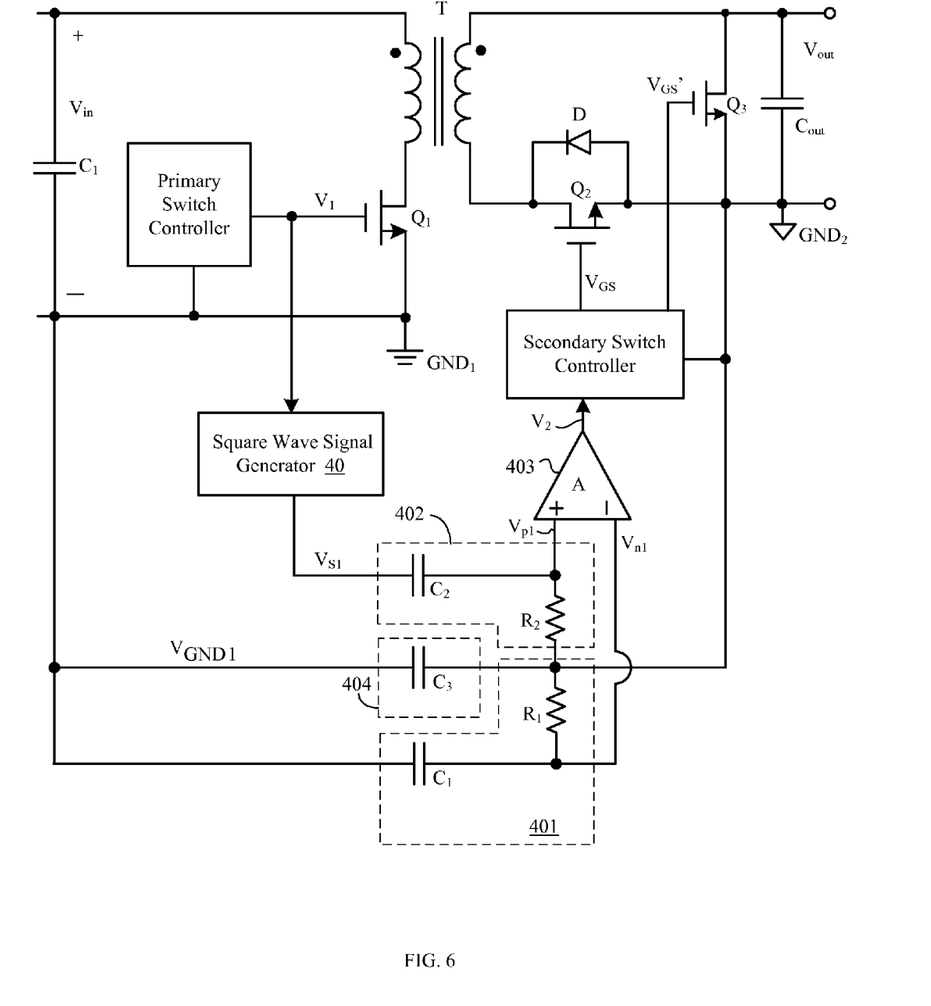
FIG. 6 is a schematic block diagram of an example control signal transmission circuit applied in a forward synchronous rectifier switching power supply, in accordance with embodiments of the present invention.

Referring now to FIG. 6, shown is a schematic block diagram of an example control signal transmission circuit applied in a forward synchronous rectifier switching power supply, in accordance with embodiments of the present invention. In this particular example, the control signals of primary switch $Q_1$ and secondary switch $Q_2$ of the synchronous rectification flyback switching power supply are in phase, and thus neither an inverting circuit nor a delaying circuit may be included square wave signal generator 40. Because there are two secondary power switches on the secondary side of the synchronous rectification flyback switching power supply in this example, the secondary switch controller can provide control signals $V_{GS}$ and $V_{GS}'$ to control the secondary power switches.

Figure 7:
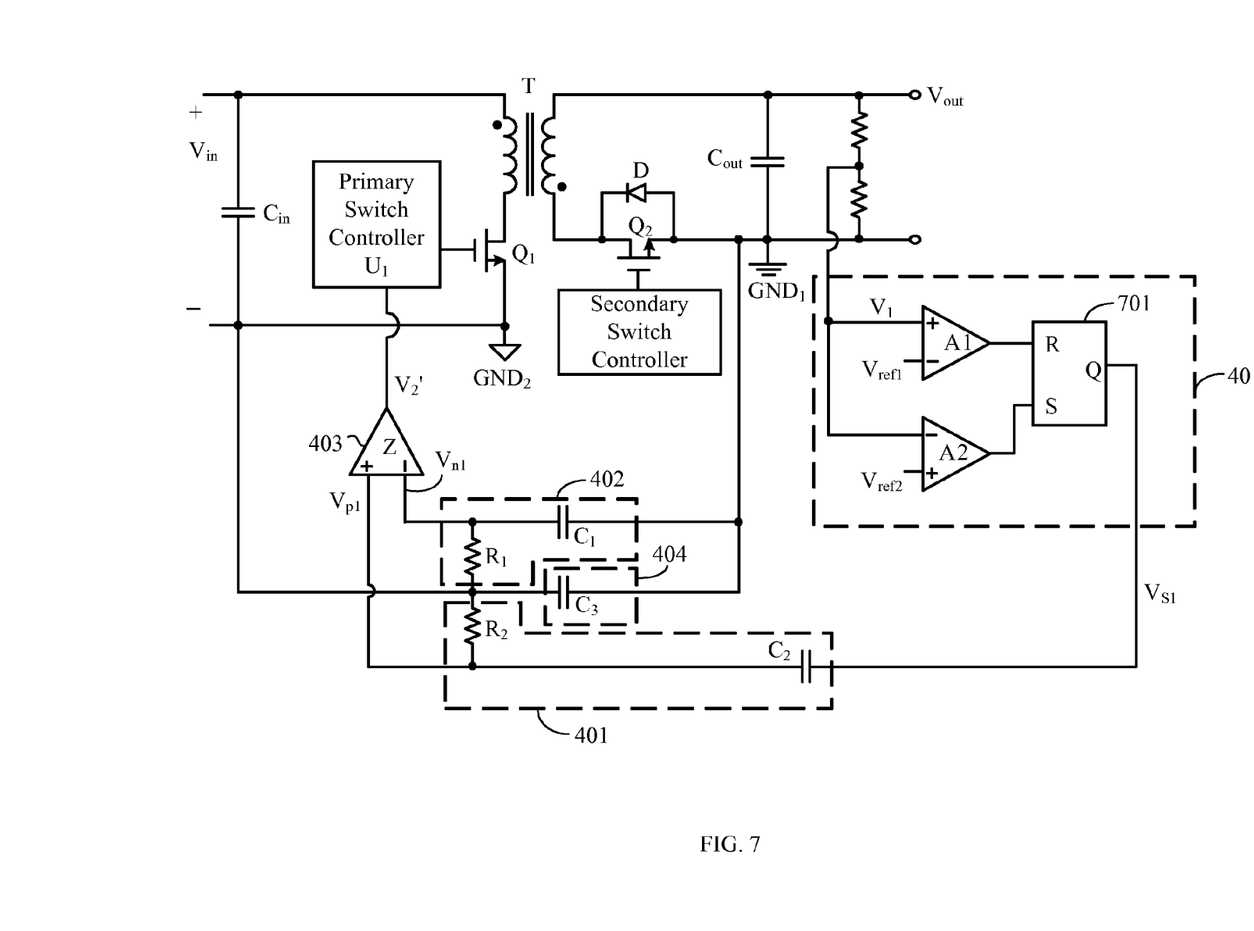
FIG. 7 is a schematic block diagram of an example control signal transmission circuit applied in a flyback synchronous rectifier switching power supply with a constant output voltage, in accordance with embodiments of the present invention.

Referring now to FIG. 7, shown is a schematic block diagram of an example control signal transmission circuit applied in a flyback synchronous rectifier switching power supply with a constant output voltage, in accordance with embodiments of the present invention. In this particular example, control signal $V_1$ can be generated by sampling output voltage $V_{out}$. Here, square wave signal generator 40 can be implemented as a feedback signal generator including comparator A1, comparator A2, and flip-flop 701.

Comparator A1 can receive control signal $V_1$ and reference voltage $V_{ref1}$, and an output of comparator A1 can be coupled to reset terminal R of flip-flop 701. Comparator A2 can receive reference voltage $V_{ref2}$ and control signal $V_1$, and output of comparator A2 can be coupled to set terminal S of flip-flop 701. For example, reference voltage $V_{ref1}$ and reference voltage $V_{ref2}$ can be predetermined voltage levels, and reference voltage $V_{ref2}$ can be lower than reference voltage $V_{ref1}$. When control signal $V_1$ is lower than reference voltage $V_{ref2}$, square wave signal $V_{S1}$ output by flip-flop 701 can be high. When control signal $V_1$ is higher than reference voltage $V_{ref2}$, square wave signal $V_{S1}$ output by flip-flop 701 can be low. Because the ground noise signal (e.g., $V_{GND1}$) can be included in output voltage $V_{out}$, square wave signal $V_{S1}$ generated from output voltage $V_{out}$ may also include the ground noise signal.

Similar to examples above, the control signal transmission circuit can include signal converter 401, signal converter 402, and control signal generator 403. In this example, for accurate transmission of rising and falling edges of square wave signal $V_{S1}$ to achieve real-time control of output voltage $V_{out}$, hysteresis comparator Z can be configured as control signal generator 403, and may generate control signal $V_2'$ (see, e.g., FIG. 5). The on and off states of primary switch $Q_1$ can be controlled by primary switch controller $U_1$ in accordance with control signal $V_2'$ to achieve constant voltage control for the flyback power supply.

Figure 8:
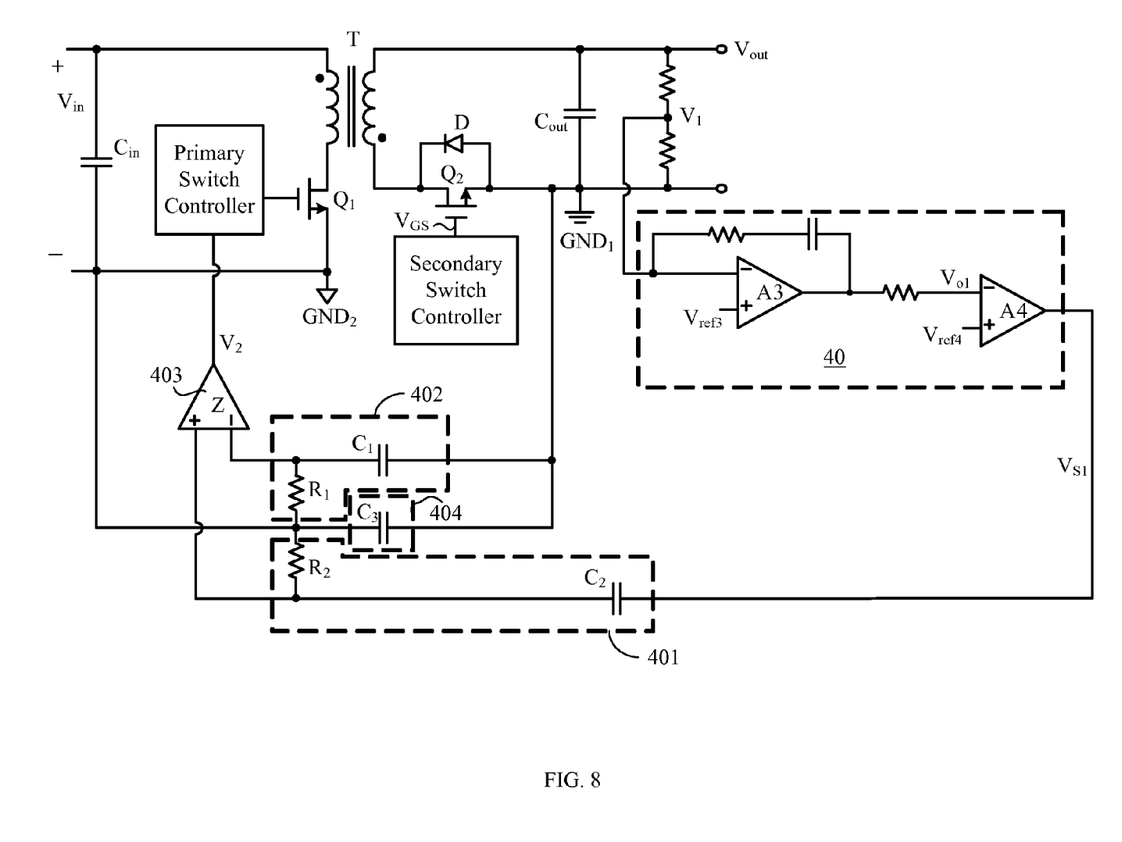
FIG. 8 is a schematic block diagram of an example control signal transmission circuit applied in a flyback synchronous rectifier switching power supply with a constant output voltage, in accordance with embodiments of the present invention.

Referring now to FIG. 8, shown is a schematic block diagram of an example control signal transmission circuit applied in a flyback synchronous rectifier switching power supply with a constant output voltage, in accordance with embodiments of the present invention. In this example, square wave signal generator 40 can be a feedback and compensation circuit that includes comparators A3 and A4. Comparator A3 can receive reference voltage $V_{ref3}$ (e.g., representing an expected output voltage of the flyback switching power supply) and control signal $V_1$ (e.g., generated by sampling output voltage $V_{out}$). Comparator A4 can receive reference voltage $V_{ref4}$ (e.g., a "sawtooth" or triangle waveform) and an output from comparator A3 (e.g., via a resistor), and may provide square wave signal $V_{S1}$ to signal converter 401.

Figure 9:
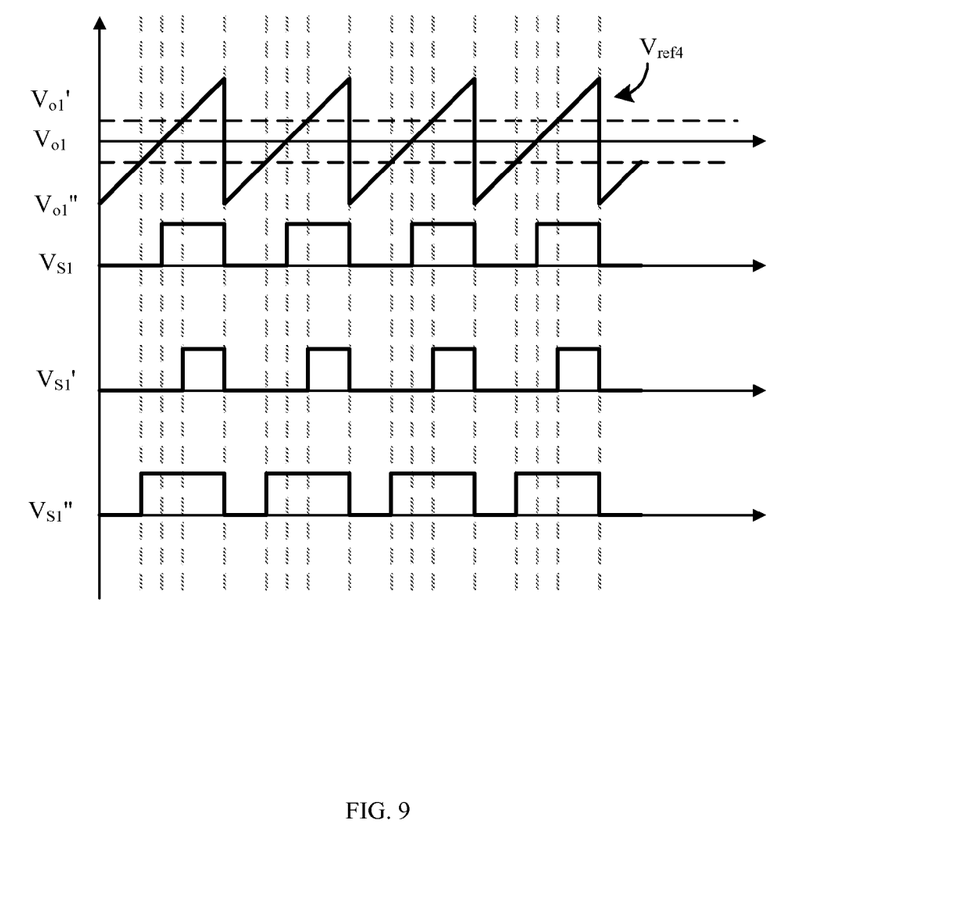
FIG. 9 is a waveform diagram showing example operation of an example square-wave signal generator, in accordance with embodiments of the present invention.

Referring now to FIG. 9, shown is a waveform diagram of example operation of an example square-wave signal generator, in accordance with embodiments of the present invention. When control signal $V_1$ is greater than reference voltage $V_{ref3}$ (and output voltage $V_{out}$ is greater than the expected output voltage), intermediate signal $V_{o1}'$ output by comparator A3 can be greater than a value $V_{o1}$ of the intermediate signal when control signal $V_1$ is consistent with reference voltage $V_{ref3}$. Intermediate signal $V_{o1}'$ and reference voltage $V_{ref4}$ can be compared by comparator A4.

The high level of square wave signal $V_{S1}'$ from comparator A4 may remain for a longer duration than when control signal $V_1$ is consistent with reference voltage $V_{ref3}$. Square wave signal $V_{S1}'$ can be transferred to the primary switch controller by the control signal transmission circuit to decrease the on time of primary switch $Q_1$, which can correspondingly decrease output voltage $V_{out}$ to reduce a difference between output voltage $V_{out}$ and the expected output voltage. When control signal $V_1$ is lower than reference voltage $V_{ref3}$, the waveforms of intermediate signal $V_{o1}''$ and square wave signal $V_{S1}''$ are indicated in FIG. 9.

Thus, when control signal $V_1$ is generated by sampling the output current, the circuits and operation of this approach can also be applied to a flyback switching power supply having a constant output current. However, particular embodiments are also applicable to a forward switching power supply having constant output voltage and/or constant output current.

In one embodiment, method of generating a control signal for an isolated power supply, can include: (i) generating a first ground noise component with a first predetermined proportionality to a ground noise signal; (ii) generating a first peak signal based on a first control signal having the ground noise signal, where the first peak signal comprises a second ground noise component with a second predetermined proportionality to the ground noise signal; (iii) generating a second control signal based on a difference between the first peak signal and the first ground noise component; and (iv) controlling, by the second control signal, a switch of the isolated power supply.

Figure 10:
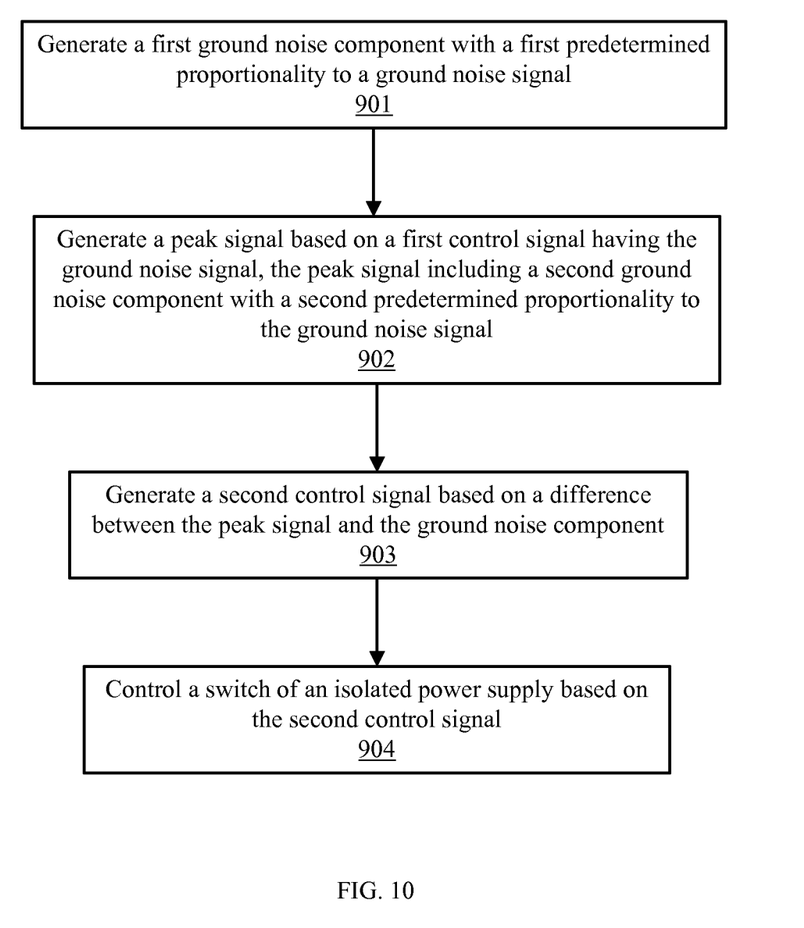
FIG. 10 is a flow diagram of an example control signal transmission method applied in an isolated power supply, in accordance with embodiments of the present invention.

Referring now to FIG. 10, shown is a flow diagram of an example control signal transmission method applied in an isolated power supply, in accordance with embodiments of the present invention. At 901, a first ground noise component (e.g., $V_{n1}$) with a first predetermined proportionality to a ground noise signal (e.g., $V_{GND1}$) can be generated. For example, the first ground noise signal can be generated by voltage dividing the ground noise signal to provide the first predetermined proportionality.

At 902, a first peak signal can be generated based on a first control signal (e.g., $V_1$) having the ground noise signal. The first peak signal (e.g., $V_{p1}$) can include a second ground noise component with a second predetermined proportionality to the ground noise signal. In addition, a square wave signal including the ground noise signal can be generated by processing the first control signal. The first peak signal including the second ground noise component can be generated by processing the square wave signal. In one example for application in a flyback power supply, the first control signal can control the primary side switch (see, e.g., FIG. 6). Generation of the square wave signal can also include inverting the first control signal such that the square wave signal is of reverse phase as compared to first control signal.

Generation of the square wave signal can also include delaying the first control signal to prevent shoot-through, and to improve control accuracy of the synchronous rectification power supply. In addition, the first control signal can be obtained by sampling the output voltage or output current of the isolated power supply in some configurations (e.g., for output voltage and/or current control).

At 903, a second control signal can be generated based on a difference between the first peak signal and the first ground noise component. For example, generation of the second control signal (e.g., $V_2$) can include comparing (e.g., via 403) the first peak signal against the first ground noise component (e.g., $V_{n1}$). Alternatively, a second peak signal can be generated by performing subtraction between the first peak signal and the first ground noise component, and then by using a pulse trigger on the second peak signal to generate the second control signal.

At 904, a switch (e.g., $Q_2$) of the isolated power supply can be controlled by the second control signal. The second control signal can be of relatively high accuracy and without ground noise, and may be configured as the control signal of the isolated power supply. The control signal transmission circuit of particular embodiments can be applied for switch control of power supply operation at various frequencies, such as high frequency operation. In addition, isolation between primary ground and secondary ground can be achieved by an isolation circuit to improve safety and reliability of the power supply. Further, any suitable topology (e.g., flyback, forward, half-bridge, full-bridge, etc.) or circuit arrangement of the isolation power supply can be supported in particular embodiments.

The embodiments were chosen and described in order to best explain the principles of the invention and its practical applications, to thereby enable others skilled in the art to best utilise the invention and various embodiments with modifications as are suited to the particular use contemplated. It is intended that the scope of the invention be defined by the claims appended hereto and their equivalents.

What is claimed is:

1. A control signal transmission circuit configured in an isolated power supply, the control signal transmission circuit comprising:

a) a first signal converter coupled to a first ground potential having a ground noise signal, and to a second ground potential of said isolated power supply, wherein said first signal converter is configured to generate a first ground noise component with a first predetermined proportionality to said ground noise signal;

b) a second signal converter coupled to a first control signal having said ground noise signal, and to said second ground potential, wherein said second signal converter is configured to generate a first peak signal based on said first control signal and having a second ground noise component with a second predetermined proportionality to said ground noise signal; and c) a control signal generator configured to generate a second control signal based on a difference between said first peak signal and said first ground noise component, wherein said second control signal is configured to control a switch of said isolated power supply.

2. The control signal transmission circuit of claim 1, wherein said first signal converter comprises:
a) a first capacitor coupled to said first ground potential and a first resistor; and
b) said first resistor being coupled to said second ground potential, wherein a signal at a common node of said first capacitor and said first resistor is configured as said first ground noise component.

3. The control signal transmission circuit of claim 1, wherein said second signal converter comprises:
a) a second capacitor configured to receive said first control signal, and coupled to a second resistor; and
b) said second resistor being coupled to said second ground potential, wherein a signal at a common node of said second capacitor and said second resistor is configured as said first peak signal.

4. The control signal transmission circuit of claim 1, wherein said control signal generator comprises a hysteresis comparator.

5. The control signal transmission circuit of claim 1, wherein said control signal generator comprises:
a) a subtraction circuit configured to receive said first peak signal and said ground noise signal, and to generate a second peak signal; and
b) a pulse signal generator configured to receive said second peak signal, and to generate said second control signal.

6. The control signal transmission circuit of claim 1, further comprising:
a) a square wave signal generator configured to convert said first control signal to a square wave signal; and
b) said second signal converter being configured to generate said first peak signal based on said square wave signal.

7. The control signal transmission circuit of claim 6, wherein:
a) said first control signal is configured to control a primary switch of said isolated power supply; and
b) said first square wave signal generator comprises an inverting circuit when said first control signal comprises a logic state opposite to that of said second control signal.

8. The control signal transmission circuit of claim 6, wherein an output feedback signal of said isolated power supply is configured as said first control signal.

9. An isolated power supply, comprising:
a) an isolated main circuit;
b) a primary switch controller;
c) an isolation circuit configured to isolate a primary ground from a secondary ground of said isolated main circuit; and
d) said control signal transmission circuit of claim 1.

10. The isolated power supply of claim 9, wherein:
a) a topology of said isolated main circuit comprises at least one of: flyback, forward, half-bridge, and full-bridge; and
b) said isolation circuit comprises a capacitor.

11. A method of generating a control signal for an isolated power supply, the method comprising:
a) generating a first ground noise component with a first predetermined proportionality to a ground noise signal;
b) generating a first peak signal based on a first control signal having said ground noise signal, wherein said first peak signal comprises a second ground noise component with a second predetermined proportionality to said ground noise signal;
c) generating a second control signal based on a difference between said first peak signal and said first ground noise component; and
d) controlling, by said second control signal, a switch of said isolated power supply.

12. The method of claim 11, wherein:
a) said generating said first peak signal comprises differentiating and dividing said first control signal; and
b) said generating said first ground noise signal comprises dividing said ground noise signal.

13. The method of claim 11, wherein said generating said second control signal comprises using a hysteresis comparator to compare said first peak signal against said first ground noise component.

14. The method of claim 11, wherein said generating said second control signal comprises:
a) subtracting said first ground noise component from said first peak signal to generate a second peak signal; and
b) pulse triggering said second peak signal to generate said second control signal.

15. The method of claim 11, wherein said generating said first peak signal based on said first control signal comprises:
a) generating a square wave signal in accordance with said first control signal; and
b) generating said first peak signal in accordance with said square wave signal.

16. The method of claim 15, further comprising inverting said first control signal to generate said square wave signal.

17. The method of claim 11, wherein an output feedback signal of said isolated power supply is configured as said first control signal.

* * * * *